Nov. 9, 1965 F. L. WALGER 3,216,141
FLOUNDER GIG
Filed Aug. 4, 1964
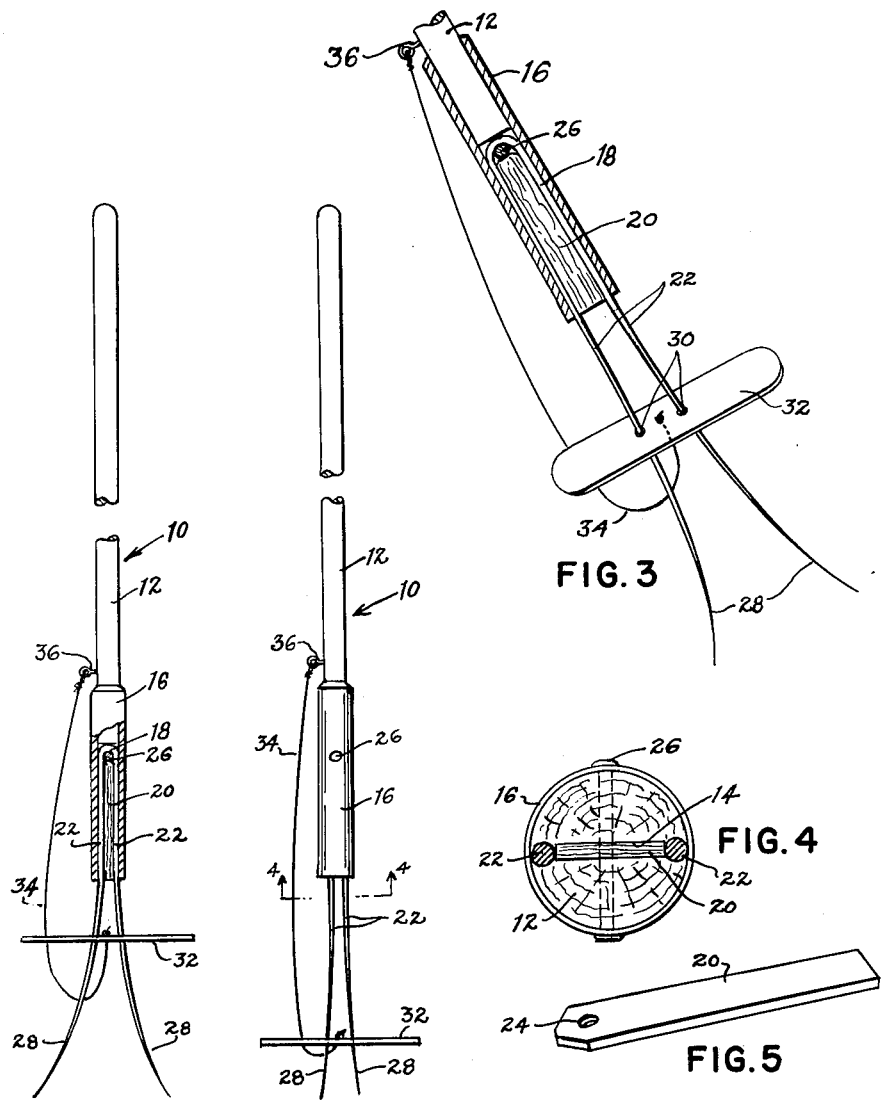
INVENTOR.
FRED L. WALGER 3,216,141
FLOUNDER GIG
Fred Lee Walger, 1103 Brooks Ave., Rosenberg, Tex.
Filed Aug. 4, 1964, Ser. No. 387,437
2 Claims. (Cl. 43—6)

This invention relates to fishing equipment and, more particularly, to a flounder gig for spearing flounder.

It is an object of the present invention to provide a flounder gig having a spear with barbless prongs which will engage and securely hold the flounder thereupon without damaging the flesh thereof.

Another object of the present invention is to provide a flounder gig of the type described in which the prongs of the spear can be readily withdrawn from the flounder without tearing the flesh.

Still an additional object of the present invention is to provide a completely self-contained flounder gig of the aforementioned type in which the barbless prongs automatically spread apart to secure the flounder thereupon immediately upon impaling the flounder.

All of the foregoing and still further objects and advantages of this invention will become apparent from a study of the following specification, taken in connection with the accompanying drawing wherein:

FIGURE 1 is a side elevational view of a flounder gig assembly made in accordance with the present invention, with the parts in an initial position ready for use;

FIGURE 2 is a view similar to FIGURE 1, with parts broken away, and with the parts shown in the position after impaling a flounder thereupon;

FIGURE 3 is an enlarged fragmentary perspective view, with parts broken away, of the assembly shown in FIGURE 2;

FIGURE 4 is an enlarged transverse cross sectional view taken along line 4—4 of FIGURE 1; and FIGURE 5 is an enlarged perspective view of a keeper portion forming a part of the present invention.

Referring now to the drawing, a flounder gig 10 made in accordance with the present invention is shown to include an elongated handle 12 having a diametrical slot 14 at one end. This one end of the handle is received within a ferrule 16 which serves to rigidify and reinforce the end of the handle, as well as to serve as a mounting for the associated parts thereof.

A spear comprising a substantially U-shaped spring wire member having a bight portion 18 and a pair of legs 22 terminating in outwardly curved pointed prongs 28, is received within a diametrical slot 14 of the handle 12 and within the ferrule 16. A keeper member 20 having an aperture 24 at one end, is received between the legs 22 of the spear, within the slot 14, and serves to maintain the adjacent portions of the legs 22 in spaced apart parallel relationship. A rivet 26 extends through the bight portion 18 of the spear, the aperture 24 in the keeper 20, and through diametrically opposed openings in the ferrule 16 and handle 12, thus locking all of the parts in assembled relationship.

An actuator plate 32 having a pair of longitudinally spaced apart apertures 30, is slidably carried upon the legs 22 of the spear. The distance between the apertures 30 is slightly greater than the distance between the legs 22 within the ferrule 16. Thus, as the actuator plate 32 moves upwardly from an initial position adjacent the pointed ends of the prongs 28, as shown in FIGURE 1, toward the upper end of the handle 12, the outwardly curved legs 22 are spread further apart, as shown in FIGURE 2, for purposes hereinafter more fully described. A flexible cable chain 34, secured at one end to the actuator plate 32, is secured at its opposite end to a fastener 36 adjacent the upper end of the ferrule 16 on the handle 12, to prevent accidental loss of the actuator plate 32. This cable chain 34, also limits the downward movement of the actuator plate 32 to provide the proper setting therefor, for use.

In actual use, the actuator plate 32 is moved to the position shown in FIGURE 1. The gig is then used to spear a flounder, during which spearing, the pointed prongs 28 pass through the flounder and continued downward movement of the gig causes the actuator plate 32 to be moved upwardly upon the legs 22 of the spear, at which time the outwardly biased legs 28 are permitted to spread apart to the position shown in FIGURE 2, in which position the flounder is effectively impaled upon the prongs 28 until recovered and removed. The actuator plate 32 may then be reset to its initial position shown in FIGURE 1 for re-use.

It will now be recognized that it is not necessary to have barbs on the prongs 28, so that removal of the flounder is very simple and does not require tearing of the flesh in any way.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A flounder gig comprising, in combination, a handle, a ferrule secured to one end of said handle, a spear having one end carried by said ferrule and said handle, said spear comprising a pair of outwardly biased prongs, an actuator plate slidably carried by said spear, said actuator plate in an initial position adjacent the outermost end of said prongs maintaining said prongs in substantially spaced apart parallel relationship, said actuator plate in a retracted position inwardly of said outermost ends of said prongs permitting said outermost ends of said prongs to diverge, said one end of said handle defining a diametrically extending slot, said spear comprising a substantially U-shaped spring member having a bight portion received within said slot and a pair of sides defining said prongs, a filler plate received within said bight portion and said slot maintaining said sides in spaced apart parallel relationship, and said ferrule receiving said slot portion of said handle.

2. A flounder gig as set forth in claim 1, wherein said actuator plate defines a pair of longitudinally spaced apart apertures slidably receiving said prongs, the distance between said apertures being slightly greater than the distance between said sides of said spear confined within said ferrule, whereby movement of said actuator plate toward said bight portion accommodates said outward diverging movement of said prongs.

References Cited by the Examiner
UNITED STATES PATENTS 1,172,780   2/16   Ferree _____ 43—36
2,550,376   4/51   Peterson _____ 43—36

SAMUEL KOREN, Primary Examiner.